UNITED STATES PATENT OFFICE.

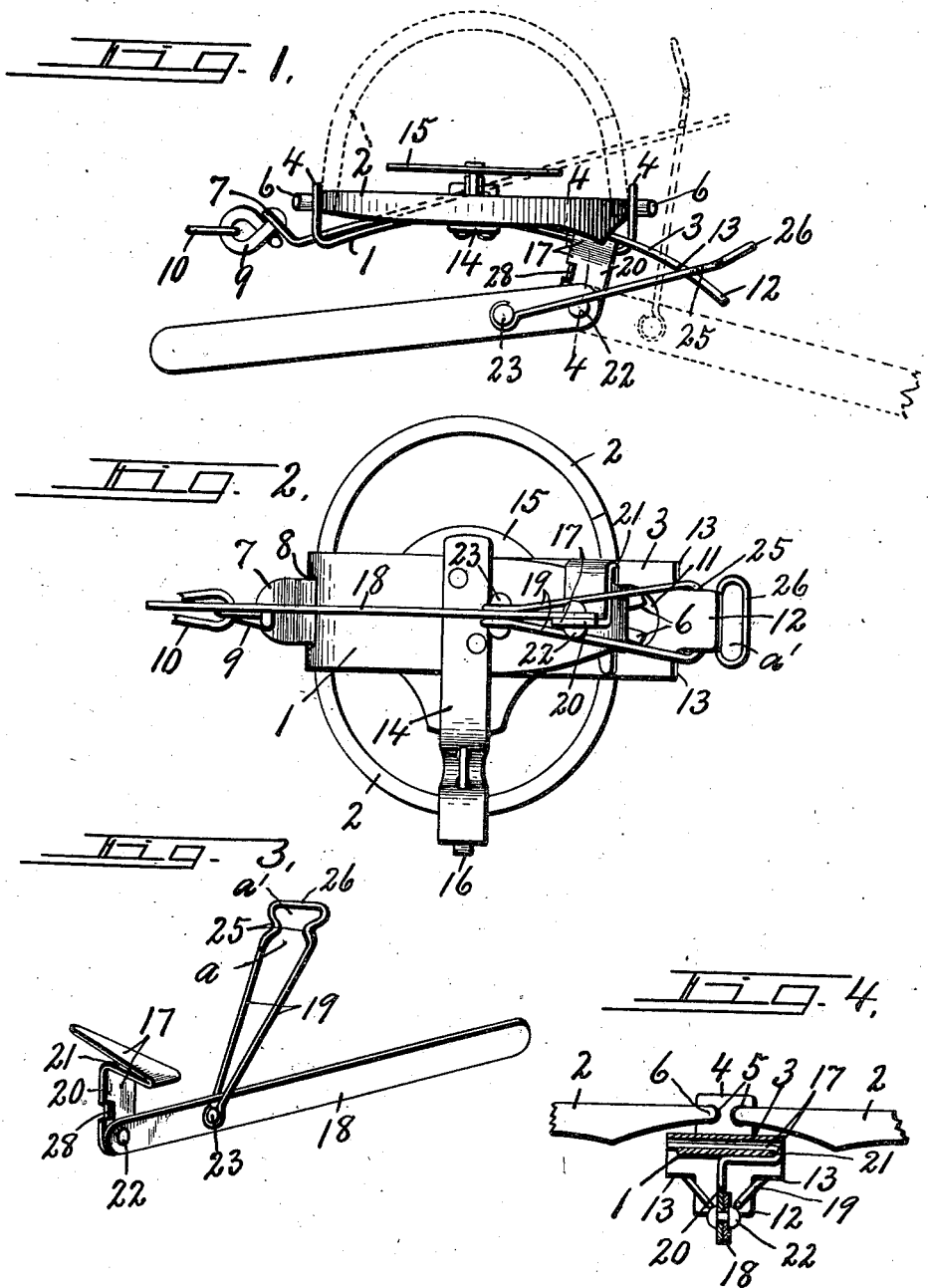

JARED E. ALLEN AND FERRAND F. ELLIS, OF ONEIDA, NEW YORK, ASSIGNORS TO ONEIDA COMMUNITY LIMITED, OF ONEIDA, NEW YORK, A CORPORATION OF NEW YORK.

DEVICE FOR SETTING ANIMAL-TRAPS.

1,011,102.         Specification of Letters Patent.         Patented Dec. 5, 1911.

Application filed September 9, 1911. Serial No. 648,535.

*To all whom it may concern:*

Be it known that we, JARED E. ALLEN and FERRAND F. ELLIS, of Oneida, in the county of Madison, in the State of New York, have invented new and useful Improvements in Devices for Setting Animal-Traps, of which the following, taken in connection with the accompanying drawings, is a full, clear, and exact description.

This invention relates to certain improvements in devices for setting animal traps having all of the advantages of the device set forth in Patent #898,731 September 15, 1908 together with the additional advantages that it may be used for setting traps of various sizes and that the operating lever is more effectively locked in its " setting position " against accidental release.

The main object, therefore, of our present invention is to render the device capable of being used for setting traps of various sizes by providing the spring engaging loop with a plurality of spring engaging members spaced different distances from the point of connection of said loop with the operating lever.

Another object is to provide means coacting with the loop to hold the lever in its set position against accidental release.

Other objects and uses will be brought out in the following description:

In the drawings—Figure 1 is a side elevation of an animal trap and our improved setting device in position for setting the trap, the jaws of the trap and movable parts of the setting device being also shown by doteed lines in their released positions or about to be moved to thier setting positions. Fig. 2 is an inverted plan of the same trap and setting device shown in Fig. 1. Fig. 3 is a perspective view of the detached trap setting device. Fig. 4 is a transverse sectional view through a portion of the setting device and trap taken on line 4—4, Fig. 1.

In order that the operation of our invention may be clearly understood we have shown an ordinary animal trap comprising a supporting base —1—, opposed jaws —2— and a spring —3—, the base —1— preferably consisting of a bar of plate or spring metal having its intermediate portion arched upwardly and its opposite ends bent in the same direction to form suitable ears —4— having apertures —5— for receiving the pintles —6— of the jaws —2—.

The spring —3— preferably consists of a single leaf or plate tensioned so as to normally assume a substantially straight line and is of somewhat greater length than the length of the base —1—, one end of said spring being reduced in width forming a tongue —7— which is passed through a laterally elongated slot —8— near the junction of one of the ears —4— with the main body of the base —1— so as to hold the adjacent end of the spring in close contact with the adjacent portion of the outer convex face of the base.

The tongue —7— is deflected upwardly in close proximity to the base to prevent accidental withdrawal of the spring therefrom and is suitably apertured for receiving a swivel bolt —9—, the latter being adapted to be connected by a chain —10— to any suitable anchoring device, not necessary to herein illustrate or describe. The opposite end of the spring extends some distance beyond the corresponding end of the base and is provided with an opening —11— and a reduced terminal tongue —12— forming shoulders —13— for a purpose hereinafter described.

The object of the opening —11— is to receive the adjacent ends of the jaws 2— and corresponding ear —4— of the base —1— to permit said spring to be depressed below the plane of the pintles —6—. The width of the opening is approximately equal to but slightly larger than the corresponding width of the adjacent ends of the jaws when closed so that when the spring is released, the walls of the opening will ride along the outer edges of and effectively close said jaws. Secured to the base —1— is a laterally extending cross bar —14— upon which is mounted in any well known manner the usual platform —15— and detent or catch —16—, these parts being well known in the art and it is therefore unnecessary to further illustrate or describe the same as they form no part of our present invention.

*Trap setting device.*—The trap setting device forming the subject matter of this invention comprises an attaching member —17—, an operating lever —18—, and a spring engaging and tensioning member —19—. The attaching member —17— is adapted to be detachably interlocked with a portion of one end of the base —1— nearest the free end of the spring —3— as shown more particularly in Figs. 1 and 2 and in order that this may be done easily and quickly, one end of the attaching member is bent or offset laterally at substantially right angles to the main upright body as —20— and folded upon itself to form an intervening groove or recess —21— of just sufficient depth to easily receive the portion of the base —1— with which it is adapted to engage, the offset portions at opposite sides of the loop serving to hold the attaching member against relative transverse movement on the base and at the same time permitting the setting device to be easily and quickly placed in operative position and removed after the trap is set.

The operating lever —18— is pivotally connected by a rivet —22— to the lower end of the upright portion —20— of the attaching member —17—, said rivet having its opposite ends protruding outwardly some distance and convexed to frictionally engage the tensioning member —19— and hold the operating lever —18— against accidental release when the device is in its setting position or while the jaws are being locked in their open position by means of the detent —16— and coöperating portion of the platform —15—. The spring tensioning member —19— preferably consists of a single piece of spring wire bent in the form of a loop and having its opposite ends pivotally connected by a rivet or bolt —23— to the intermediate portion of the operating lever —18— but nearer to the pivot —22—.

In order that this device may be used for setting traps of various sizes in which the springs —3— are of varying lengths and degrees of vertical movement, the free end of the tensioning device or loop —19— is provided with a plurality of, in this instance two, sets of spring engaging members —25— and —26— spaced different distances apart from the point of connection as —23— of said tensioning member with the operating lever —18—. The spring engaging members —25— are formed by bending portions of opposite sides of the loop —19—, just inside of the engaging member —26—, inwardly toward each other leaving sufficient clearance between the engaging members —25— and —26— for the reception of the tongue —12— of the spring —3—.

The space between opposite sides of the loop —19— just at the inner sides of the members —25— and —26— is approximately equal to or slightly greater than the width of the tongue —12— so as to allow either portion of the tongue —12— to be slipped over and upon said tongue and against the shoulders —13—, the latter forming limiting stops to prevent further inward movement of the loop along the tongue during the operation of setting the trap.

The openings in the loop for the reception of the tongue —12— of the spring —3— may be designated respectively by the reference letters —a— and —a'— and it is now evident that the tongue may be inserted through either one of these openings according to the size of the trap or degree of movement of the free end of the spring necessary to shift it from its normal position shown by dotted lines in Fig. 1 to its extreme tension postion below the pintles —6— as shown by full lines in the same figure.

In the operation of setting the trap by means of the lever —18—, the loop —19— is moved across the axis of the pivotal bolt —22— and in order that this movement to the upper side of the axis may not be excessive or sufficient to cause the loop —19— to slide off from the tongue —12— of the spring —3—, we provide the upright portion —20— of the attaching member —17— with a suitable stop shoulder —28— just above and at one side of the pivot —22— so as to engage the upper edge of the operating lever as soon as the loop —19— has been moved slightly past the axis of the pivotal bolt —22—. The normal distance between the inner sides of the opposite arms of the loop —19— where they intersect the axis of the pivotal bolt —22— during the operation of the lever —18— in setting the trap is slightly less than the distance between the points of the outer ends of said pivotal bolt so as to cause these portions of the loop to frictionally ride over said points, during which the opposite sides of the loop are sprung slightly apart, thereby causing the opposite sides of the loop to frictionally bind against the opposite ends of the pivotal bolt —22— to hold the operating lever in its operative position against accidental release, while the jaws are being locked in their open position.

In setting the trap by means of this device, the attaching member —17— is first slipped over and upon the end of the base —1— nearest the free end of the spring —3— so as to rest against the inner side of the adjacent ear —4—, whereupon the loop —19— is rocked to its operative position to engage one or the other of the members —25— or —26— (according to the size of the trap) with the tongue —12— of the spring —3—, the parts being then in the position shown by dotted lines in Fig. 1, whereupon the lever —18— is rocked by hand to the position shown by full lines until the intermediate portion of the loop is carried upwardly past the axis of the pivotal bolt —22— or until said lever is limited in its upward movement by engagement with the stop —28—, at which time the opposite sides of the loop are in frictional contact with the convex ends of the pivotal bolt —22— just above its axis to hold the lever against accidental release. During this operation, the free end of the spring —3— will have been drawn downwardly against its own tension below the pintles —6—, thereby allowing the jaws to be opened or set in the usual manner.

After the trap is set in the manner described, the lever —18— is rocked in a reverse direction to release the tensioning member —19— from the tongue —12— of the spring —3—, whereupon the attaching member —17— may be readily withdrawn by hand from operative engagement with the base —1— so that the same device may be used for setting any number of traps.

What we claim is:

1. A trap setting device having a longitudinally movable spring-tensioning member provided with spring-engaging shoulders spaced apart in the direction of movement for engaging and tensioning the springs of traps of different sizes, and means for operating the tensioning member.

2. A trap setting device having a spring-tensioning member, means for operating said member, and additional means frictionally engaged by said member for holding it and its operating means in its spring-tensioning position.

3. A trap setting device comprising an attaching member for attachment to a portion of a trap, a lever pivoted to said member, a spring-tensioning member pivoted to the lever and having a plurality of spring-engaging members different distances from its pivot for engaging the springs of traps of different sizes.

4. A trap setting device comprising an attaching member for attachment to a portion of a trap, a lever pivoted to said member, a spring-tensioning member pivoted to the lever and having a plurality of spring-engaging members different distances from its pivot for engaging the springs of traps of different sizes, said tensioning member being movable to opposite sides of the axis of the lever, the pivot of the lever having portions thereof projecting into the path of movement of portions of the tensioning member to frictionally engage said tensioning member and thereby hold it and the lever in operative position for said trap.

5. A trap setting device comprising an attaching member for attachment to a portion of the trap, a lever pivoted to the attaching member and having the ends of its pivot protruding beyond the side faces of the lever and attaching member, a spring-tensioning member having opposite arms pivoted at one end of the lever and their opposite ends connected to each other and provided with spring-engaging members at different distances from the point of connection of said arms with the lever, and a stop for limiting the movement of the lever in one direction.

In witness whereof we have hereunto set our hands.

JARED E. ALLEN.
FERRAND F. ELLIS.

Witnesses:
E. F. KITENDAUGH,
A. C. JONES.

---

Copies of this patent may be obtained for five cents each, by addressing the "Commissioner of Patents, Washington, D. C."